United States Patent [19]

Phillips

[11] E Re. 30,429

[45] Reissued Nov. 4, 1980

[54] MINIMIZATION OF RESIDUAL SPACECRAFT NUTATION DUE TO DISTURBING TORQUES

[75] Inventor: Kevin J. Phillips, Hightstown, N.J.

[73] Assignee: RCA Corporation, New York, N.Y.

[21] Appl. No.: 968,799

[22] Filed: Dec. 12, 1978

Related U.S. Patent Documents

Reissue of:

[64] Patent No.: 3,997,137
Issued: Dec. 14, 1976
Appl. No.: 423,441
Filed: Dec. 10, 1973

[51] Int. Cl.[3] ..... B64G 1/26

[52] U.S. Cl. ..... 244/169; 244/3.22

[58] Field of Search ..... 244/164, 169, 170, 171, 244/172, 3.22, 3.21, 3.23

[56] References Cited

U.S. PATENT DOCUMENTS

| | | | |
|---|---|---|---|
| 2,974,594 | 3/1961 | Boehm | 244/169 |
| 3,135,479 | 6/1964 | Badewitz | 244/169 |
| 3,384,323 | 5/1968 | Gilbert et al. | 244/170 |
| 3,414,214 | 12/1968 | Robinson et al. | 244/164 |
| 3,437,288 | 4/1969 | Lam | 244/3.22 |
| 3,643,897 | 2/1972 | Johnson | 244/170 |
| 3,695,554 | 10/1972 | Phillips | 244/170 |
| 3,937,423 | 2/1976 | Johansen | 244/169 |
| 3,977,633 | 8/1976 | Keigler | 244/169 |
| 3,984,071 | 10/1976 | Fleming | 244/169 |
| 4,023,752 | 5/1977 | Pistiner et al. | 244/169 |

FOREIGN PATENT DOCUMENTS 2100261 3/1972 France .

OTHER PUBLICATIONS

P. C. Wheeler, "Two-Pulse Attitude Control of an Asymmetric Spinning Satellite" AIAA Guidance and Control Conference, 8-12-63.

*Primary Examiner*—Galen L. Barefoot
*Attorney, Agent, or Firm*—H. Christoffersen; Joseph D. Lazar; Samuel Cohen

[57] ABSTRACT

Spacecraft nutation caused by applying attitude and/or orbit control forces to a spacecraft along an axis which does not pass through the spacecraft's center of gravity is minimized by a signal responsive control system which first operates the attitude and/or orbit control forces for a predetermined time period and automatically after an appropriate non-operating time period, the attitude and/or orbit control forces are again operated for the same predetermined time period.

14 Claims, 3 Drawing Figures

MINIMIZATION OF RESIDUAL SPACECRAFT NUTATION DUE TO DISTURBING TORQUES

Matter enclosed in heavy brackets [ ] appears in the original patent but forms no part of this reissue specification; matter printed in italics indicates the additions made by reissue.

CROSS-REFERENCE TO RELATED APPLICATIONS

Of interest is the following copending patent application which is assigned to the same assignee as the present patent application: Ser. No. 423,442, filed Dec. 10, 1973, now abandoned, but continued in Ser. No. 558,182, filed Mar. 13, 1975, *now U.S. Pat. 4,023,752, issued May 17, 1977,* entitled "Elimination of Residual Spacecraft Nutation Due to Propulsive Torques" based on the invention of Josef Siegfried Pistiner, Ludwig Muhlfelder, and John Edward Keigler.

BACKGROUND OF THE INVENTION

1. Field of the Invention

This invention relates to spacecraft attitude and/or orbit control systems and is particularly directed to systems for controlling spacecraft nutation caused by external forces and torques used to change spacecraft attitude or orbit.

2. Description of the Prior Art

A problem frequently encountered in applying thrust forces from thrusters in dual-spin or spin stabilized spacecraft for controlling spacecraft attitude and/or station keeping orbital adjustments is an undesirable spacecraft nutation or coning movement. Spacecraft nutation is caused by a misaligned torque due to a thrust force directed along an axis which does not pass through the spacecraft center of gravity. Such a thrust force will be referred to as a misaligned thrust force. The nutation causing torque resulting from the misaligned thrust force has a component at right angles to the spacecraft's total momentum vector. Many systems have been proposed heretofore for controlling such undesirable spacecraft nutation. Some prior art attitude and/or orbit control systems use a combination of passive elements arranged to dissipate the undesirable spacecraft nutation. Other prior art attitude and/or orbit control systems counteract spacecraft nutation by use of an external force or forces generated by special spacecraft thrusters activated by electrical signals from sensors which detect spacecraft nutation.

A combination of special nutation counteracting thrusters and sensors or passive elements arranged solely for the dissipation or damping of spacecraft nutation due to thrust force misalignment increase the complexity of spacecraft control system design. Accordingly, it is desirable to minimize spacecraft nutation caused by thrust misalignments without substantially increasing the complexity of spacecraft attitude and orbit control systems.

SUMMARY OF THE INVENTION

Spacecraft nutation caused by operating a force generating means for effecting changes in spacecraft attitude and/or orbit is minimized by a spacecraft attitude and orbit control system comprising receiver means coupled to logic means for automatically controlling the operating and non-operating time periods for the force generating means. The receiver means receives and transmits signals determining a predetermined operating time period, $T_1$, for the force generating means. The logic means are coupled to the receiver means and responsive to the receiver transmitted signals which cause the logic means to transmit signals for turning on and thus activating the force generating means for the predetermined operating period $T_1$. The logic means automatically turns off and thus deactivates the force generating means for a predetermined waiting period, $T_w$, and then automatically turns on and thus activates the force generating means again for the same predetermined time period $T_1$.

DESCRIPTION OF THE PREFERRED EMBODIMENT

Figure 1A:
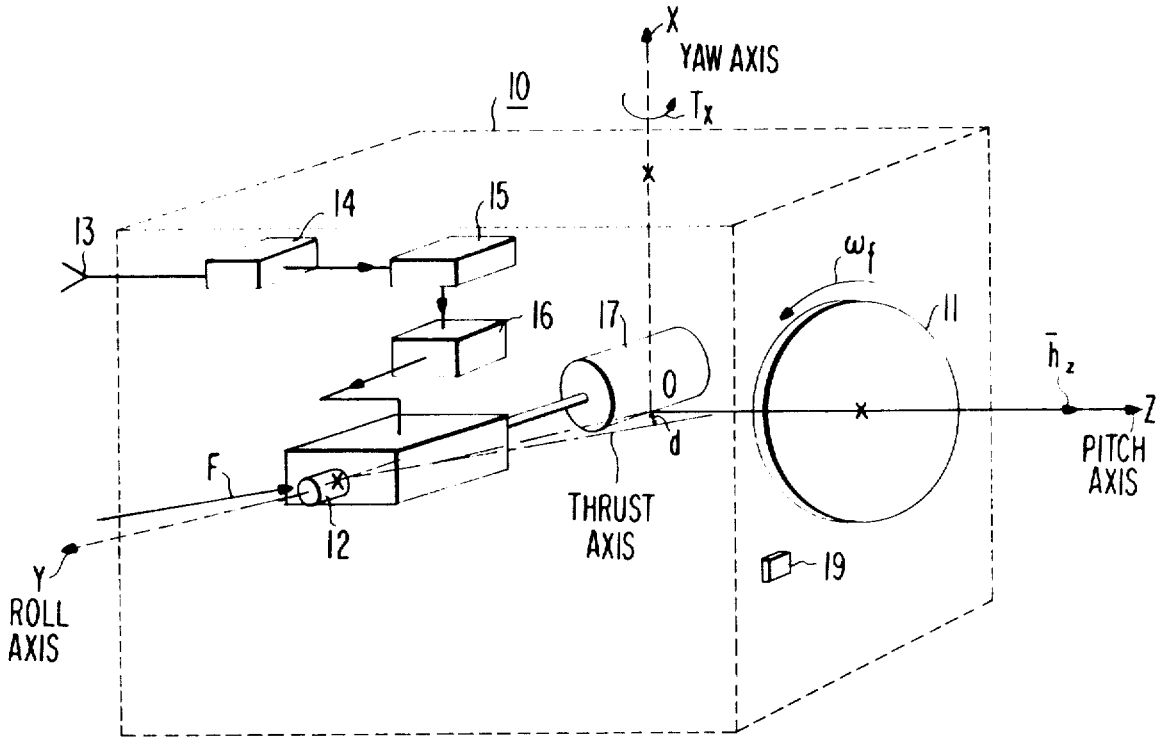
FIG. 1a is a diagrammatic representation of a despun spacecraft embodying the attitude and orbit control system of the present invention.

Orbiting spacecraft in one form or another often require a change in spacecraft attitude or orientation in keeping with a desired spacecraft mission. Such spacecraft may be a spinning type in which the entire body spins, a dual spin type or a de-spun type containing a spinning momentum wheel from which the remainder of the spacecraft is de-spun, all of which types provide spacecraft gyroscopic stiffness as is well known in the art. Both spinning and de-spun spacecraft have a total angular momentum represented as a vector. H, preferably directed along or aligned with a spacecraft principal axis of inertia (x, y or z). The angular momentum vector of a de-spun spacecraft is proportional to the angular velocity of the spinning momentum wheel and, in the absence of spacecraft nutation, is directed along the axis about which the momentum wheel is spinning. When the total angular momentum vector, H, is directed along the z axis, the x and y axes are in a plane transverse to the z axis. The x−y plane will be referred to as the transverse plane.

Thrusters capable of generating a force are appropriately mounted on the spacecraft. The thrusters are fired at a predetermined time for producing the necessary force or thrust required to effect a desired change in spacecraft attitude or velocity. Spacecraft attitude may also be controlled in response to an applied torque from a spacecraft reaction wheel having a spin axis transverse to the momentum wheel. If the thrust axis, or the axis along which the thrust force is directed, does not pass through the spacecraft center of gravity and the resulting torque, T, applied to the spacecraft has a component orthogonal to the spacecraft total angular momentum vector, H, there results an undesirable spacecraft nutation or wobble at frequency $\omega_n$. The spacecraft nutation frequency, $\omega_n$, is determined by:

$$\omega_n = \frac{H}{\sqrt{I_x \times I_y}} \quad (1)$$

where H is the total spacecraft angular momentum, $I_x$ is the spacecraft moment of inertia about the x axis, a principal axis of inertia in the transverse plane, and $I_y$ is the spacecraft moment of inertia about the y axis, a principal axis of inertia orthogonal to the x axis and also in the transverse plane.

Prior to nutation, the angular momentum vector, H, of either a spinning spacecraft or a de-spun spacecraft, is preferably directed along or aligned with a spacecraft principal axis of inertia, for example, the z axis. When a spacecraft is subjected to a nutation-causing torque, the spacecraft momentum vector, H, will no longer be aligned with the z axis but will have a direction which varies with time in the spacecraft x, y, z coordinate system, the torque vector and the thrusting period. A spacecraft subjected to nutation will have angular momentum components of the total spacecraft momentum vector, H, in a plane transverse to the spin axis. In other words, the tip of the momentum vector, H, of a spacecraft subjected to nutation, moves along a predictable path in the x, y and z body coordinate system. The path is determined by known spacecraft parameters, the torque magnitude and the torque thrusting period. Therefore, knowing the path along which the spacecraft momentum vector, H, will move, a control system is described below which automatically activates and controls a jet engine thrusting period or the thrusting period of a force generating means in order to align the spacecraft momentum vector, H, with the spacecraft z axis or the wheel spin axis in a dual spin or despun spacecraft and thus minimize spacecraft nutation and transverse angular momentum components of the total spacecraft momentum vector H.

Figure 1B:
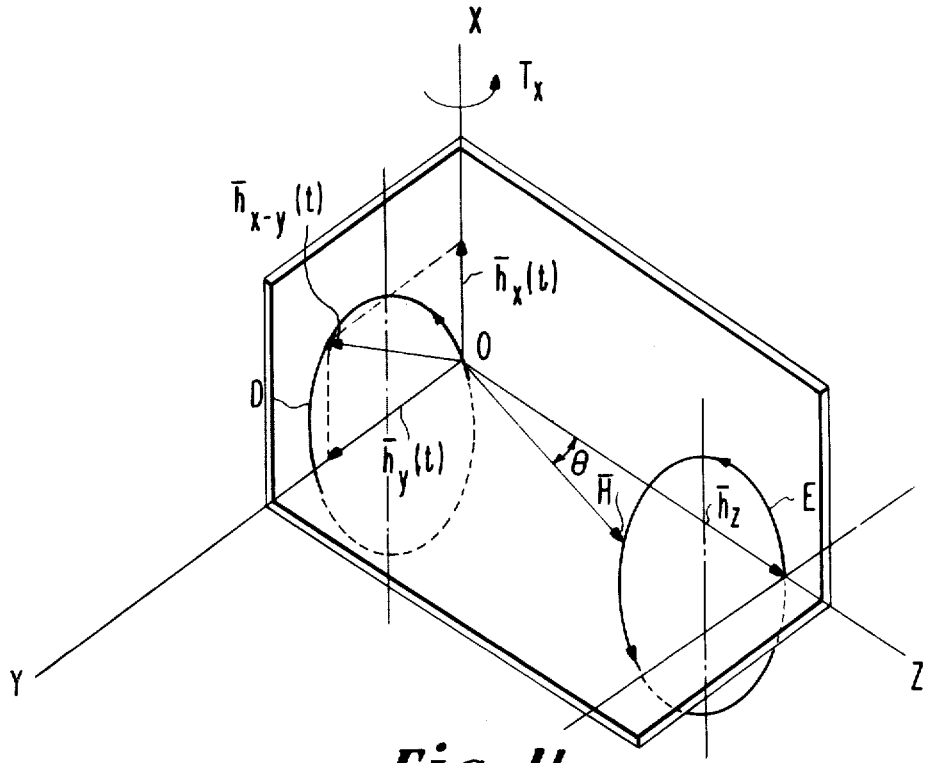
FIG. 1b is a graphical representation of a path over which a transverse angular momentum vector, $h_{x-y}(t)$, and spacecraft angular momentum vector H may move in time within a spacecraft co-ordinate system over a spacecraft nutation cycle.

Referring to FIG. 1a, there is shown a de-spun spacecraft 10 having a momentum wheel 11 spinning in the counterclockwise direction shown about a spacecraft principal axis (z axis) with an angular velocity, $\omega_f$. The operation of a de-spun spacecraft 10 will be described in more detail later. FIG. 1b is a graphical representation of the spacecraft's angular momentum vector, H, when spacecraft 10 is subjected to a nutation causing torque, $T_x$. The spacecraft z axis will be referred to as the spin axis because it is the axis about which momentum wheel 11 is spinning. In the absence of spacecraft nutation spacecraft momentum vector H is substantially equal to $h_z$ and is aligned with the z axis. The magnitude of the spacecraft angular momentum, $h_z$, prior to nutation is determined by the equation:

$$h_z = \omega_f I_f \quad (2)$$

where $\omega_f$ is the angular velocity of momentum wheel 11 and $I_f$ is the moment of inertia of momentum wheel 11. It should be noted that the magnitude of total spacecraft momentum vector, H, is substantially equal to the magnitude of spacecraft momentum vector $h_z$ when the transverse momentum components of total angular momentum, H, have a relatively small magnitude. Therefore, under these conditions, spacecraft nutation frequency, $\omega_n$, may be determined by:

$$\omega_n = \frac{h_z}{\sqrt{I_x \times I_y}} \quad (3)$$

where $h_z$ is determined by equation (2), $I_x$ is the spacecraft moment of inertia about the x axis and $I_y$ is the spacecraft moment of inertia about the y axis.

In the event force, F, from thruster 12 is applied to spacecraft 10 such that it causes a system disturbance torque, $T_x$, (defined as a component of a total torque vector, $F \times d$, directed along the x axis, where F is the position vector of force F and d is the position vector of the perpendicular distance from the spacecraft center of mass, 0 to the vector F) about the spacecraft x axis or an axis transverse to the spin axis or z axis. Torque, $T_x$, causes a time varying angular momentum in the transverse $x-y$ plane of the spacecraft represented in FIG. 1b as a transverse angular momentum vector $h_{x-y}(t)$ having a time varying component along the x axis, $h_x(t)$, and a time varying component along the y axis, $h_y(t)$. Thus, transverse angular momentum $h_{x-y}(t)$ is equal to the vector sum of $h_x(t)+h_y(t)$. The magnitude and direction of the total spacecraft momentum vector, H, is equal to the vector sum of $h_x(t)+h_y(t)+h_z(t)$. The magnitude of the time varying angular momentum component, $h_x(t)$, along the x axis is determined by the equation:

$$h_x(t) = T_x/\omega_n \sin \omega_n t \quad (4)$$

where $T_x$ is the magnitude of the applied torque about the x axis, t is the time period from the instant of application of torque $T_x$, and $\omega_n$ is the spacecraft nutation frequency defined by equation (1). The magnitude of the time varying angular momentum component, $h_y(t)$ along the y axis is determined by the equation $$h_y(t) = \sqrt{\frac{I_y}{I_x}} \times \frac{T_x}{\omega_n}(1 - \cos \omega_n t) \quad (5)$$

where $I_y$ is the spacecraft moment of inertia about the y axis $I_x$ is the spacecraft moment of inertia about the x axis, $T_x$ is the magnitude of the applied torque, t is the time period from the instant of application of torque $T_x$, and $\omega_n$ is the spacecraft nutation frequency defined by equation (1).

In a de-spun spacecraft, the tip of the transverse momentum vector, $h_{x-y}(t)$, moves in an elliptical path, as a function of time, in the transverse $x-y$ plane when the moment of inertia, $I_x$, about the x axis is not equal to the moment of inertia, $I_y$, about the y axis. It is apparent from equations (4) and (5) that the tip of the transverse momentum vector, $h_{x-y}(t)$, moves in a circular path as a function of time in the transverse $x-y$ plane when the moment of inertia about the x axis, $I_x$, is equal to the moment of inertia about the y axis, $I_y$.

Ellipse D in FIG. 1(b) graphically represents an elliptical path describing the movement, in time, of transverse momentum vector $h_{x-y}(t)$ in response to the magnitude of applied torque $T_x$. Thus, ellipse D [suggest] *suggests* that by selectively choosing the period or the time duration of the applied force, F, or resulting torque, $T_x$, the magnitude of transverse momentum vector $h_{x-y}(t)$ can be minimized causing spacecraft momentum vector, H, moving in time along elliptical path E, to be aligned substantially along the z axis and reducing spacecraft nutation due to thrust misalignment.

Figure 2:
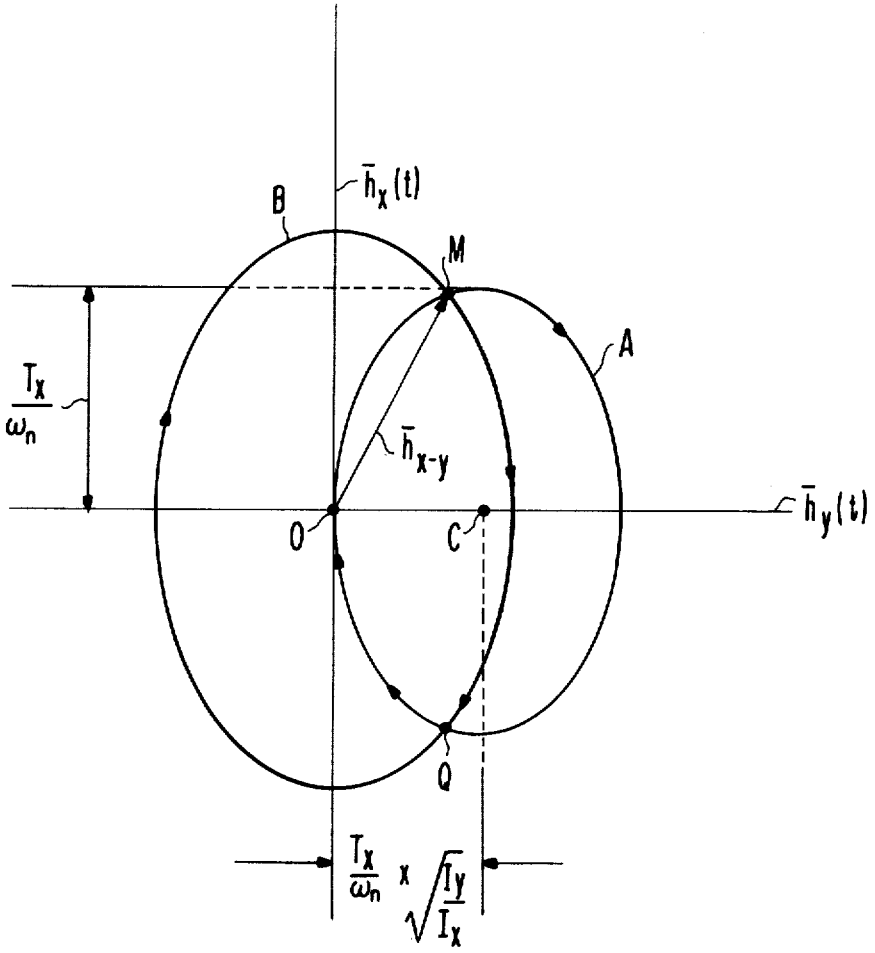
FIG. 2 is a more detailed graphical representation of a path over which a transverse angular momentum vector $h_{x-y}(t)$ may move in time within a spacecraft co-ordinate system over a spacecraft nutation cycle when a force generating means is periodically turned on and off.

Referring to FIG. 2, there is shown a more detailed graphical representation of the movement in time of the tip of transverse momentum vector, $h_{x-y}(t)$, in the transverse x−y plane when jet engine 12 (FIG. 1a) is pulsed on and off. It is assumed for purposes of illustration, and not limitation, that the tip of transverse momentum vector, $h_{x-y}(t)$, moves in elliptical paths as a function of time in response to a nutation causing torque, $T_x$, applied about a de-spun spacecraft x axis. It is further assumed that spinning momentum wheel 11 causes an angular momentum represented by momentum vector, $h_z$, aligned along the z axis.

Ellipse A describes a path along which the tip of transverse momentum vector $h_{x-y}(t)$ will move as a function of time in the x−y plane if the nutation causing torque, $T_x$, is applied over one cycle of nutation frequency, $\omega_n$, defined by equation (1). The components of $h_{x-y}(t)$, ($h_x(t)$ and $h_y(t)$), are determined from equations (4) and (5).

Ellipse B describes a path of residual nutation along which the tip of transverse momentum vector $h_{x-y}(t)$ will move as a function of time in the x−y plane if the nutation causing torque, $T_x$, was suddenly withdrawn after being applied to spacecraft 10 for a time period $T_1$ during which time period the tip of transverse momentum vector $h_{x-y}(t)$ moved along elliptical path A from point O to point M. In other words, ellipse B, centered at the origin O, is a plot of the ensuing residual spacecraft nutation or the path the tip of transverse momentum vector $h_{x-y}(t)$ would move if the nutation causing torque, $T_x$, suddenly ceased after having been applied to spacecraft 10 for a time period $T_1$. It will be assumed that the magnitude of $I_y$ is less than the magnitude of $I_x$ for purposes of illustrating the shape of ellipses A and B in FIG. 2. Ellipse B may be plotted when the minor to major axis ratio, R, and the coordinates of a point (M) on ellipse A are known. Minor to major axis ratio, R, for both ellipse A and B is defined by:

$$R = \sqrt{\frac{I_y}{I_x}} \tag{6}$$

where $I_y$ is the spacecraft moment of inertia about the y axis, and $I_x$ is the spacecraft moment of inertia about the x axis.

Spacecraft nutation or coning is often referred to in terms of the half coning angle, $\theta$, determined by:

$$\theta = \frac{h_{x-y}(t)}{h_x} \tag{7}$$

where $h_{x-y}(t)$ is the transverse angular momentum previously defined and $h_z$ is defined by equation (2). As seen in FIGS. 1b and 2, the magnitude of transverse momentum vector $h_{x-y}(t)$ and the half cone angle $\theta$ is minimum at origin 0. Therefore, if thruster 12 is operated for a time period, $T_1$, transverse momentum vector $h_{x-y}(t)$ moves in an elliptical path along ellipse A from origin O to point M at which time spacecraft thruster 12 is turned off by firing electronics circuit 16 in FIG. 1a. Residual nutation will cause transverse momentum vector $h_{x-y}(t)$ to move in time in an elliptical path along ellipse B to point Q on ellipse A, at which time spacecraft thruster 12 is again turned on by firing electronics circuit 16 in FIG. 1a for time period $T_1$ causing transverse momentum vector $h_{x-y}(t)$ to move along ellipse A from point Q back to origin O where the magnitude of transverse momentum vector $h_{x-y}(t)$ and undesirable spacecraft nutation is minimum. Therefore, knowing the total thruster operating time, $2T_1$, required for a desired spacecraft maneuver, thruster 12 is first operated for one-half the total thrust operating time, turned off for a predetermined waiting period, $T_w$, and then operated a second time for one-half the total thruster operating time. Waiting period, $T_w$, is determined from equation:

$$T_\omega \frac{2}{\omega_n} \tan \frac{1 + \cos \omega_n T_1}{\sin \omega_n T_1} \tag{8}$$

where $\omega_n$ is the nutation frequency defined by equation (1) And $T_1$ is the time period thruster 12 is first operated. Therefore, knowing only the thruster operating period required for a desired spacecraft maneuver and the nutation frequency $\omega_n$ determined from equation (1), spacecraft nutation due to thruster misalignment is minimized.

Referring again to FIG. 1a, a command signal to fire or turn on thruster 12 and draw fuel, such as compressed gas or the like, from tank 17 for a known time period $T_1$ is transmitted from a ground station, not shown, to antenna 13 and command or telemetry receiver 14. The ground station command signal may be in response to a signal from a suitable spacecraft attitude deviation detecting sensor 19 mounted on spacecraft 10. Telemetry receiver 14 is any suitable prior art system which processes a received signal from a ground station and transmits the processed ground station signal to logic circuit 15. Spacecraft moments of inertia, $I_x$ and $I_y$, and angular momentum $h_z$ (determined from equation (2)) are information stored in a memory bank in logic circuit 15. Logic circuit 15 is suitably arranged in a manner well known in the art, to compute equation (8) and generate an output logic signal in response to an output signal from receiver 14. The output logic signal from logic circuit 15 is a sequence of signals indicating thruster 12 should first be turned on for time period $t_1$, then turned off for a time period, $T_w$, determined by equation (8), and then turned on a second time for time period $T_1$, thus completing the total jet engine operating period of $2T_1$. The output logic signal from logic circuit 15 is transmitted to firing electronics circuit 16 including a timer, not shown, arranged to respond to the output signal from logic circuit 15 and turn on or fire thruster 12 for time period $T_1$. Thruster 12 is automatically turned off by firing electronics circuit 16 at the end of time period $T_1$, for a waiting time period, $T_w$, determined by equation (8) and the corresponding output logic signal from logic circuit 15. At the end of waiting time period, $T_w$, an output logic signal from logic circuit 15 automatically triggers the timer in firing electronics circuit 16 to turn on thruster 12 for the time period $T_1$. Thus, de-spun spacecraft nutation or coning in an attitude or orbit changing maneuver is eliminated by automatically firing spacecraft thruster 12 on and off in a predetermined sequence. It should be noted that as an alternative embodiment, all control signals determining thruster on/off periods may be determined by logic circuits in the ground transmitting station.

In another embodiment logic circuit 15 may be arranged in a manner well known in the art to compute both the total thruster operating period, $2T_1$, and the waiting period, $T_w$, required for a desired spacecraft maneuver in response to a signal from attitude deviation detecting sensor 19. Logic circuit 15 is arranged to transmit, to firing electronics circuit 16, a signal determining a first thruster operating period $T_1$, a waiting period $T_w$ and a second thruster operating period $T_1$. This embodiment is referred to as a closed loop control system.

In summary, a control system for minimizing nutation in a spacecraft due to operation of a spacecraft thruster is disclosed. The spacecraft thruster is first operated for one-half the total operating period required for a desired spacecraft maneuver and then the thruster is turned off for a waiting period, $T_w$, determined by equation (8). The thruster is operated a second time for one-half the total operating period required for the desired spacecraft maneuver at the end of waiting period $T_w$.

Although an attitude or orbit control system for a de-spun spacecraft has been described, the general principle of nutation control disclosed above is applicable to spinning or dual-spin spacecraft. Variations and modifications may be made without departing from the present invention. Accordingly, it should be understood that the form of the present invention described above and shown in the figures of the accompanying drawing is illustrative only and is not intended to limit the scope of the invention.

What is claimed is:

1. A method for minimizing nutation in a spacecraft of the dual spin type having a spin axis and a characteristic nutation period and further having a platform despun from a spinning member, comprising the steps of:

transmitting signals to spacecraft receiver means causing a receiver means output signal;

coupling said receiver output signal to logic circuit means causing a logic circuit means output signal;

activating a force generating means mounted on said platform a first time for a predetermined operating period $T_1$ in response to said logic circuit output signal, said predetermined operating period determined by said logic means to be a predetermined portion of said nutation period of said spacecraft;

deactivating said force generating means for a waiting period $T_w$, in response to said logic circuit means output signal at the end of said predetermined operating period $T_1$;

activating said force generating means automatically a second time in response to said logic circuit means output signal for said predetermined operating period $T_1$ after said waiting period $T_w$, wherein said waiting period, $T_w$, is determined by:

$$T_w = \frac{2}{\omega_n} - \tan^{-1} \frac{1 + \cos \omega_n T_1}{\sin \omega_n T_1}$$

where $\omega_n$ is the spacecraft nutation frequency and $T_1$ is said force generating means operating period.

2. A control system for minimizing nutation in a spacecraft of the dual-spin type having a spin axis and a characteristic nutation period, and further having a platform despun from a spinning member, comprising:

receiver means included in said spacecraft for receiving signals transmitted to said spacecraft, and generating in response thereto a receiver means output signal;

logic means coupled to said receiver means and in response to said receiver output signal generating a logic control output signal; and torque generating means mounted on said platform and coupled to said logic means and, in response to said logic control output signal, activating said torque generating means for a predetermined operating period $T_1$, said predetermined period $T_1$ determined by said logic means to be a predetermined portion of said nutation period of said spacecraft, at the end of said period $T_1$ automatically deactivating said torque generating means for a predetermined waiting period $T_w$, and at the end of said waiting period $T_w$, automatically activating said torque generating means again for said predetermined operating period $T_1$, wherein said waiting period, $T_w$, is determined by $$T_w = \frac{2}{\omega_n} - \tan^{-1} \frac{1 + \cos \omega_n T_1}{\sin \omega_n T_1}$$

where $\omega_n$ is spacecraft nutation frequency and $T_1$ is said predetermined spacecraft operating period.

3. A control system according to claim 2, wherein said torque generating means is at least one thruster.

4. A control system according to claim 2, wherein said logic means includes a firing electronics circuit including a timer means arranged to respond to said logic output signals and to activate said force generating means for said predetermined operating period, $T_1$, then automatically deactivating said torque generating means for a predetermined waiting period, $T_w$, and then automatically activating said torque generating means again for said predetermined operating period, $T_1$.

5. A closed loop attitude control system for minimizing nutation in a spacecraft of the dual-spin type having a spin axis and a characteristic nutation period, and further having a platform despun from a spinning member, comprising:

detector means included in said spacecraft for detecting a deviation from a desired spacecraft attitude, and generating in response thereto a detector means output signal;

logic means coupled to said detector means and in response to said detector output signal generating a logic control output signal; and torque generating means mounted on said platform and coupled to said logic means and, in response to said logic control output signal, activating said torque generating means for a predetermined [,] operating period $T_1$, said predetermined period $T_1$ determined by said logic means to be a predetermined portion of said nutation period of said spacecraft, at the end of said period $T_1$ automatically deactivating said torque generating means for a predetermined waiting period $T_w$, and at the end of said waiting period $T_w$, automatically activating said torque generating means again for said predetermined operating period $T_1$, wherein said waiting period, $T_w$, is determined by:

$$T_w = \frac{2}{\omega_n} - \tan^{-1} \frac{1 + \cos \omega_n T_1}{\sin \omega_n T_1}$$

where $\omega_n$ is spacecraft nutation frequency and $T_1$ is said predetermined spacecraft operating period.

6. A control system according to claim 5, wherein said torque generating means includes at least one thruster.

7. A control system according to claim 5, wherein said logic means include a firing electronics circuit including a timer means arranged to respond to said logic output signals and activate said force generating means for said predetermined operating period, $T_1$, then automatically deactivating said torque generating means for a predetermined waiting period, $T_w$, and then automatically activating said torque generating means again for said predetermined operating period, $T_1$.

*8. A method for reducing nutation caused by a thrust force not passing through the center of gravity of a spacecraft of the dual spin type having a spin axis and a characteristic nutation period and further having a platform despun from a spinning member, comprising the steps of:*

*transmitting signals to spacecraft receiver means causing a receiver means output signal;*

*coupling said receiver output signal to logic circuit means causing a logic circuit means output signal;*

*activating a force generating means mounted on said platform for producing said thrust force a first time for a predetermined operating period $T_1$ in response to said logic circuit output signal, said predetermined operating period determined by said logic means to be a predetermined portion of said nutation period of said spacecraft;*

*deactivating said force generating means for a waiting period $T_w$ in response to said logic circuit means output signal at the end of said predetermined operating period $T_1$;*

*activating said force generating means automatically for producing said thrust force a second time in response to said logic circuit means output signal for said predetermined operating period $T_1$ after said waiting period $T_w$, wherein said waiting period, $T_w$, is determined by:*

$$T_w = \frac{2}{\omega_n} - \tan^{-1} \frac{1 + \cos \omega_n T_1}{\sin \omega_n T_1}$$

*where $\omega_n$ is the spacecraft nutation frequency and $T_1$ is said force generating means operating period.*

*9. A control system for reducing nutation caused by a thrust force not passing through the center of gravity of a spacecraft of the dual-spin type having a spin axis and a characteristic nutation period, and further having a platform despun from a spinning member, comprising:*

*receiver means included in said spacecraft for receiving signals transmitted to said spacecraft, and generating in response thereto a receiver means output signal;*

*logic means coupled to said receiver means and in response to said receiver output signal generating a logic control output signal; and*

*torque generating means mounted on said platform for producing said thrust force and coupled to said logic means and, in response to said logic control output signal, activating said torque generating means for a predetermined operating period $T_1$, said predetermined period $T_1$ determined by said logic means to be a predetermined portion of said nutation period of said spacecraft at the end of said period $T_1$ automatically deactivating said torque generating means for a predetermined waiting period $T_w$, and at the end of said waiting period $T_w$, automatically activating said torque generating means again for producing said thrust force for said predetermined operating period $T_i$, wherein said waiting period, $T_w$, is determined by:*

$$T_w = \frac{2}{\omega_n} - \tan^{-1} \frac{1 + \cos \omega_n T_1}{\sin \omega_n T_1}$$

*where $\omega_n$ is spacecraft nutation frequency and $T_1$ is said predetermined spacecraft operating period.*

*10. A control system according to claim 9, wherein said torque generating means is at least one thruster.*

*11. A control system according to claim 9, wherein said logic means includes a firing electronics circuit including a timer means arranged to respond to said logic output signals and to activate said force generating means for said predetermined operating period, $T_1$, then automatically deactivating said torque generating means for a predetermined waiting period, $T_w$, and then automatically activating said torque generating means again for said predetermined operating period, $T_1$.*

*12. A closed loop attitude control system for reducing nutation caused by a thrust force not passing through the center of gravity of a spacecraft of the dual-spin type having a spin axis and a characteristic nutation period, and further having a platform despun from a spinning member, comprising:*

*detector means included in said spacecraft for detecting a deviation from a desired spacecraft attitude, and generating in response thereto a detector means output signal;*

*logic means coupled to said detector means and in response to said detector output signal generating a logic control output signal; and*

*torque generating means mounted on said platform for producing said thrust force and coupled to said logic means and, in response to said logic control output signal, activating said torque generating means for a predetermined operating period $T_1$, said predetermined period $T_1$ determined by said logic means to be a predetermined portion of said nutation period of said spacecraft, at the end of said period $T_1$ automatically deactivating said torque generating means for a predetermined waiting period $T_w$, and at the end of said waiting period $T_w$, automatically activating said torque generating means again for producing said thrust force for said predetermined operating period $T_1$,*

*wherein said waiting period, $T_w$, is determined by:*

$$T_w = \frac{2}{\omega_n} - \tan^{-1} \frac{1 + \cos \omega_n T_1}{\sin \omega_n T_1}$$

*where $\omega_n$ is spacecraft nutation frequency and $T_1$ is said predetermined spacecraft operating period.*

*13. A control system according to claim 12, wherein said torque generating means includes at least one thruster.*

*14. A control system according to claim 12, wherein said logic means includes a firing electronics circuit including a timer means arranged to respond to said logic output signals and activate said force generating means for said predetermined operating period, $T_1$, then automatically deactivating said torque generating means for a predetermined waiting period, $T_w$, and then automatically activating said torque generating means again for said predetermined operating period, $T_1$.*

* * * * *

UNITED STATES PATENT AND TRADEMARK OFFICE
CERTIFICATE OF CORRECTION

PATENT NO. : Re. 30,429

DATED : Nov. 4, 1980

INVENTOR(S) : Kevin J. Phillips

It is certified that error appears in the above-identified patent and that said Letters Patent is hereby corrected as shown below:

Col. 5, equation 7, "=" should be --≈--.

Col. 6, line 7, "thrust" should be --thruster--.

Col. 6, line 18, "And" should be --and--.

Col. 6, equation 8, "$T_w \frac{2}{\omega_n} \tan \ldots$" should be

--$T_w = \frac{2}{\omega_n} \tan^{-1} \ldots$--.

Col. 7, claim 1, equation, "$T_w = \frac{2}{\omega_n} - \tan^{-1} \ldots$" should be --$T_w = \frac{2}{\omega_n} \tan^{-1} \ldots$--.

Col. 8, claim 2, equation, "$T_w = \frac{2}{\omega_n} - \tan^{-1} \ldots$" should be --$T_w = \frac{2}{\omega_n} \tan^{-1} \ldots$--.

Col. 8, claim 5, equation, "$T_w = \frac{2}{\omega_n} - \tan^{-1} \ldots$" should be --$T_w = \frac{2}{\omega_n} \tan^{-1} \ldots$--.

UNITED STATES PATENT AND TRADEMARK OFFICE
CERTIFICATE OF CORRECTION

PATENT NO. : Re. 30,429

DATED : Nov. 4, 1980

INVENTOR(S) : Kevin J. Phillips

It is certified that error appears in the above-identified patent and that said Letters Patent is hereby corrected as shown below:

Col. 9, claim 8, equation, "$T_w = \frac{2}{\omega_n} - \tan^{-1}$..." should be --$T_w = \frac{2}{\omega_n} \tan^{-1}$...--.

Col. 10, claim 9, equation, "$T_w = \frac{2}{\omega_n} - \tan^{-1}$..." should be --$T_w = \frac{2}{\omega_n} \tan^{-1}$...--.

Col. 10, claim 12, equation, "$T_w = \frac{2}{\omega_n} - \tan^{-1}$..." should be --$T_w = \frac{2}{\omega_n} \tan^{-1}$...--.

Signed and Sealed this

*Twenty-sixth* Day of *May 1981*

[SEAL]

*Attest:*

RENE D. TEGTMEYER

*Attesting Officer* *Acting Commissioner of Patents and Trademarks*